United States Patent [19]
Takahashi et al.

[11] Patent Number: 5,250,322
[45] Date of Patent: Oct. 5, 1993

[54] WATER-REPELLENT METAL OXIDE FILM COATED ON GLASS SUBSTRATE AND METHOD OF FORMING SAME

[75] Inventors: Osamu Takahashi; Hiroaki Arai, both of Mie, Japan

[73] Assignee: Central Glass Company Limited, Ube, Japan

[21] Appl. No.: 990,995

[22] Filed: Dec. 16, 1992

[30] Foreign Application Priority Data

Dec. 25, 1991 [JP] Japan .................. 3-343656

[51] Int. Cl.$^5$ .................. B05D 3/02; C09K 3/18
[52] U.S. Cl. .................. 427/226; 106/2; 106/287.13; 106/287.14; 106/287.16; 427/429; 428/428; 428/429; 501/12
[58] Field of Search .................. 106/2, 287.13, 287.14, 106/287.16; 427/226, 429; 428/428, 429; 501/12

[56] References Cited

U.S. PATENT DOCUMENTS

| | | | |
|---|---|---|---|
| 4,525,213 | 6/1985 | Linn | 106/2 |
| 4,648,904 | 3/1987 | DePasquale et al. | 106/2 |
| 4,874,431 | 10/1989 | Fey et al. | 106/2 |
| 5,051,129 | 9/1991 | Cuthbert et al. | 106/2 |
| 5,073,195 | 12/1991 | Cuthbert et al. | 106/2 |
| 5,196,054 | 3/1993 | Schmuck et al. | 106/2 |

FOREIGN PATENT DOCUMENTS

| | | | |
|---|---|---|---|
| 57-177082 | 10/1982 | Japan | 106/2 |
| 58-122979 | 7/1983 | Japan | 106/2 |
| 58-167448 | 10/1983 | Japan . | |
| 58-172245 | 10/1983 | Japan . | |
| 64-068477 | 3/1989 | Japan . | |

*Primary Examiner*—Mark L. Bell
*Assistant Examiner*—Anthony J. Green
*Attorney, Agent, or Firm*—Keck, Mahin & Cate

[57] ABSTRACT

The disclosure relates to a metal oxide film formed on a glass substrate by the so-gel process with using a solution of a metal alkoxide. To afford water repellency to the oxide film, a fluoroalkylsilane is mixed with an alkoxysilane solution in the molar ratio of the alkoxysilane to the fluoroalkylsilane ranging from 1:10 to 10:1. Then, the mixed solution is diluted with a solvent such that the total concentration of the alkoxysilane and the fluoroalkylsilane is from 1 to 10 wt % in a diluted solution. Then, water in the amount of 100 mol % to 1000 mol % of the total amounts of the fluoroalkylsilane and the alkoxysilane is added to the diluted solution so as to partially hydrolyze the fluoroalkylsilane and the alkoxysilane, thereby forming a sol. Then, the sol is applied to the glass substrate, and the coated glass substrate is heated so as to form the metal oxide film thereon.

11 Claims, No Drawings

WATER-REPELLENT METAL OXIDE FILM COATED ON GLASS SUBSTRATE AND METHOD OF FORMING SAME

BACKGROUND OF THE INVENTION

The present invention relates to a water-repellent metal oxide film coated on a glass substrate and a method of forming the film. The film forming method belongs to the sol-gel process using a solution of a metal alkoxide. The water-repellent coating is suitable for application, for example, to vehicular, marine, aircraft and architectural window glasses which are to be exposed to rain water.

It is well known to coat a glass plate surface with a hard and abrasion-resistant film of a metal oxide such as silicon oxide. The metal oxide film can be formed, for example, by the sol-gel process using a solution of an organic metal compound such as a metal alkoxide.

Hitherto, there have been proposals to apply, for example, a compound having a fluoroalkylsilane group or dimethylsiloxane to a glass plate surface for the purpose of improving water-repellency of the glass plate.

For example, JP-A-58-122979 and JP-A-58-172245 disclose a water and oil repellent which has a silane compound containing a polyfluoroalkyl group or a partially hydrolyzed condensation product of the silane compound, and an alkoxysilane compound or a halogenosilane compound. The silane compound and the condensation product have a group, $-CON(R^2)-Q-$ or $-SO_2N(R^2)-Q-$, wherein "Q" represents a bivalent organic group and "$R^2$" represents a hydrogen atom or a lower alkyl group.

JP-A-58-167448 discloses a metal oxide film which is coated on a glass substrate and has a thickness not greater than 1 $\mu$m. The film is formed by applying to the glass substrate a silane compound containing a polyfluoroalkyl group or a partially hydrolyzed condensation product of the silane compound.

JP-A-64-68477 discloses a water-repellent and durable metal oxide film coated on a steel plate. The film is formed by applying an alcohol solution to the steel plate and by heating the coated steel plate at a temperature not lower than 100° C. The alcohol solution contains not less than 0.05 wt % of at least one of an alkoxide, a monomethylalkoxide and an acetylacetonato of a metal selected from the group consisting of Al, Zr, Ti, Si, W, Ce, Sn and Y, and a fluoroalkylsilane of which concentration is from 0.005 to 0.30 mol % of the total amounts of the at least one of the alkoxide, the monomethylalkoxide and the acetylacetonato.

However, the above-mentioned proposals have the following drawbacks.

It is difficult to apply repellent solutions according to the above-mentioned proposals to a glass substrate, for example, through brushing by hand. That is, the thickness of films coated on the glass substrate tend to become uneven when the repellent solution is applied to the glass substrate through brushing by hand. Furthermore, the abrasion resistance of the films is still unsatisfactory.

SUMMARY OF THE INVENTION

It is therefore an object of the present invention to provide an abrasion resistant and water-repellent coating film.

It is another object of the present invention to provide a mixed solution containing a fluoroalkylsilane and a metal alkoxide, which solution can be easily applied to a glass substrate through brushing by hand.

According to the present invention, there is provided a method of forming a water-repellent metal oxide film on a glass substrate, the method comprising the steps of: mixing an alkoxysilane with a fluoroalkylsilane in the molar ratio of the alkoxysilane to the fluoroalkylsilane ranging from 1:10 to 10:1 so as to form a mixed solution; diluting the mixed solution with a solvent such that the total concentration of the alkoxysilane and the fluoroalkylsilane is from 1 to 10 wt % in a diluted solution; adding water in the amount of 100 mol % to 1000 mol % of the total amounts of the fluoroalkylsilane and the alkoxysilane to the diluted solution so as to partially hydrolyze the fluoroalkyl-silane and the alkoxysilane, thereby forming a sol; applying the sol to the glass substrate, thereby to form a gel film on the glass substrate; and heating the gel film so as to form the metal oxide film on the glass substrate.

In the present invention, the fluoroalkylsilane and the alkoxysilane are partially hydrolyzed by the addition of water in the amount of 100 mol % to 1000 mol % of the total amount of the fluoroalkylsilane and the alkoxysilane. Therefore, the mixed solution can be applied to a glass substrate through brushing by hand. Furthermore, the coating film can be uniformly thinly formed on a glass substrate, thereby not deteriorating optical characteristics of the glass substrate. Thus, according to the present invention, even when the film on the glass substrate is scratched, the film does not become hazy.

DESCRIPTION OF THE PREFERRED EMBODIMENTS

According to the present invention, the molar ratio of an alkoxysilane to a fluoroalkylsilane is from 1:10 to 10:1, and preferably from 2:1 to 8:1. If the ratio is lower than 1/10, adhesive strength of the film to the glass substrate becomes insufficient. That is, the film tends to peel off. If the ratio is higher than 10/1, the thickness of the film becomes too thick. Therefore, it is difficult to apply a mixed solution containing the fluoroalkylsilane and the alkoxysilane to a glass substrate through brushing by hand, due to uneven thickness of the film.

In the present invention, the mixed solution is diluted by a diluent such that the total concentration of the alkoxysilane and the fluoroalkylsilane is from 1 to 10 wt % in the diluted solution. If the concentration is less than 1 wt %, the film becomes insufficient with respect to water-repellency. If the concentration is greater than 10 wt %, the thickness of the film tends to become uneven.

Examples of fluoroalkylsilanes according to the present invention are $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_2SiCH_3Cl_2$ and $CF_3(CF_2)_7(CH_2)_2SiCH_3(OCH_3)_2$.

Examples of alkoxysilanes according to the present invention are $Si(OC_2H_5)_4$, $Si(OCH_3)_4$, $CH_3Si(OCH_3)_3$ and $Si(OC_3H_7)_4$. The alkoxysilanes are not limited to these compounds as long as they are hydrolyzable.

Examples of diluents according to the present invention are lower alcohols such as methanol, ethanol, butanol and isopropyl alcohol, and aromatic hydrocarbons such as xylene and toluene. The diluents are not limited to these compounds as long as the mixed solution containing the fluoroalkylsilane and the alkoxysilane is uniformly diluted thereby.

According to the present invention, water is added to the diluted solution in the amount of 100 mol % to 1000 mol % of the total amount of the fluoroalkylsilane and the alkoxysilane. If the amount is less than 100 mol %, the fluoroalkylsilane and the alkoxysilane are not sufficiently hydrolyzed. With this, adhesion of the film to the glass substrate is deteriorated. If the amount is about 1000 mol %, degree of hydrolysis reach maximum. Therefore, even if more than 1000 mol % of water is added, degree of hydrolysis does not increase any more.

In the present invention, the diluted mixed solution is applied to the glass substrate by a suitable coating method such as brushing, dip coating, spraying, flow coating or spin coating.

After applying the diluted mixed solution to the glass substrate, the coated glass substrate is heated for about 30 min at a temperature not lower than 100° C., and preferably at a temperature ranging from 100° to 400° C., so as to form a metal oxide film thereon. If the temperature is higher than 400° C., water repellency of the film tends to become insufficient. After the heating, it is desirable to gently wipe the metal oxide film surface with a dry cloth such as flannel.

According to the present invention, a very thin metal oxide film can be obtained, of which thickness ranges from that of a monomolecular film to 5 nm. If the thickness is less than a monomolecular film, the metal oxide film becomes uneven with respect to water-repellency. If the thickness is greater than 5 nm, abrasion resistance and mechanical durability of the metal oxide film are lowered and the thickness of the film tends to become uneven. The thickness can be determine, for example, by Auger electron spectroscopy or secondary ion mass spectroscopy.

A glass substrate according to the present invention is not limited to a specific type. That is, the glass substrate may be of an organic glass, colored or colorless, curved or flat, tempered, or a single plate glass or a laminated plate glass.

The present invention will be illustrated with reference to the following nonlimitative examples.

EXAMPLE 1

A glass substrate having 100 mm×100 mm widths and a thickness of 2 mm was washed with a brush and dried. After drying, the glass substrate was washed with acetone and wiped with a flannel.

1 g of $CF_3(CF_2)_7(CH_2)_2Si(OCH_3)_3$ (FAS) as a fluoroalkylsilane, which is made by Toshiba Silicon Co., was mixed with 0.18 g of $Si(OC_2H_5)_4$ (TEOS) as an alkoxysilane, which is made by Kishida Chem. Co., so as to obtain a mixed solution. The mixed solution was diluted with 50 g of isopropyl alcohol. The total concentration of FAS and TEOS in the diluted mixed solution is shown in Table 1. Water, to which 1.5 g of 60% nitric acid solution has been previously added, was mixed with the diluted mixed solution, and the stirring was continued for 30 min at room temperature so as to form a sol through partial hydrolysis of the fluoroalkylsilane and the alkoxysilane. 5 to 6 drops of this sol were dropped on the glass substrate surface with a dropping pipette, and were spread by hand on the glass substrate surface with a flannel. After that, the coated glass substrate was heated at a temperature of about 250° C. for 30 min by an electric furnace so as to form a metal oxide film thereon. After cooling the glass substrate, it was wiped with a dry flannel.

Then, the coating condition of the film was judged with naked eyes. In the column of "Coating Condition" in Table 1: "A" means that unevenness was invisible; "B" means that unevenness was somewhat visible; and "C" means that the oxide film was opaquely whitened.

The contact angle of water drop on the film was measured by a contact angle meter to evaluate water-repellency of the film. The result is shown in Table 1.

EXAMPLES 2-5

Examples 2-5 are slight modifications of Example 1 with respect to the amounts of alkoxysilane and 60% nitric acid solution, as shown in Table 1.

In addition to the above-mentioned coating condition test and the measurement of the contact angle, Due Panel Weather (D. P. W.) accelerated weatherability test was conducted on the film according to Examples 3 and 4. In this weatherability test, the glass substrate coated with the film was alternately exposed to a steam having a temperature of about 50° C. and a humidity of 100% for 4 hr, and ultraviolet rays of 3.0 mW for 8 hr. After the lapse of certain times (200, 350 and 550 hr.) in the test, the contact angle of water drop was determined. The results are shown in Table 2.

COMPARATIVE EXAMPLE 1

In this comparative example, the alkoxysilane was omitted. The above-mentioned tests are conducted on the film according to Comparative Example 1. The results are shown in Tables 1 and 2.

COMPARATIVE EXAMPLES 2-4

Comparative Examples 2-4 are modifications of Example 1 with respect to the amounts of the alkoxysilane and 60% nitric acid solution, a shown in Table 1.

The above-mentioned unevenness test was conducted and the contact angle of water drop was measured for each film according to Comparative Examples 2-4.

TABLE 1

|  | FAS (g) | TEOS (g) | Molar ratio (FAS/TEOS) | Isopropyl alcohol (g) | 60% $HNO_3$ (g) | Total Conc. of FAS and TEOS (wt %) | Coating Condition | Contact Angle (°) |
|---|---|---|---|---|---|---|---|---|
| Ex. 1 | 1 | 0.18 | 1/0.5 | 50 | 1.5 | 2.3 | A | 110 |
| Ex. 2 | 1 | 0.36 | 1/1 | 50 | 2 | 2.6 | A | 110 |
| Ex. 3 | 1 | 1.08 | 1/3 | 50 | 4 | 4.0 | A | 110 |
| Ex. 4 | 1 | 1.80 | 1/5 | 50 | 6 | 5.3 | A | 110 |
| Ex. 5 | 1 | 3.66 | 1/10 | 50 | 11 | 8.5 | A | 110 |
| Comp. Ex. 1 | 1 | 0 | 1/0 | 50 | 1 | 2.0 | A | 110 |
| Comp. Ex. 2 | 1 | 5.50 | 1/15 | 50 | 16 | 11.5 | B | 90 |
| Comp. Ex. 3 | 1 | 7.23 | 1/20 | 50 | 21 | 14.1 | C | 81 |
| Comp. Ex. 4 | 1 | 7.23 | 1/20 | 500 | 21 | 1.6 | A | 68 |

TABLE 2

|  | Contact Angle (°) | | | |
| --- | --- | --- | --- | --- |
|  | 0 hr. | 200 hr. | 350 hr. | 550 hr. |
| Ex. 3 | 110 | 103 | 102 | 87 |
| Ex. 4 | 110 | 104 | 100 | 95 |
| Comp. Ex. 1 | 110 | 80 | 62 | 23 |

What is claimed is:

1. A method of forming a water-repellent metal oxide film on a glass substrate, the method comprising the steps of:
   mixing an alkoxysilane with a fluoroalkylsilane in the molar ratio of said alkoxysilane to said fluoroalkylsilane ranging from 1:10 to 10:1 so as to form a mixed solution;
   diluting the mixed solution with a solvent such that the total concentration of said alkoxysilane and said fluoroalkylsilane is from 1 to 10 wt % in a diluted solution;
   adding water in the amount of 100 mol % to 1000 mol % of the total amounts of said fluoroalkylsilane and said alkoxysilane to the diluted solution so as to partially hydrolyze said fluoroalkylsilane and said alkoxysilane, thereby forming a sol;
   applying the sol to the glass substrate, thereby to form a gel film on the glass substrate; and
   heating the gel film so as to form the metal oxide film on the glass substrate.

2. A method according to claim 1, wherein said alkoxysilane is mixed with said fluoroalkylsilane in the molar ratio of said alkoxysilane to said fluoroalkylsilane ranging from 2:1 to 8:1.

3. A method according to claim 1, wherein the gel film is heated at a temperature ranging from 100° to 400° C.

4. A method according to claim 1, wherein the metal oxide film formed on the glass substrate has a thickness ranging from a thickness of a monomolecular film to 5 nm.

5. A method according to claim 1, further comprising adding nitric acid to the diluted solution.

6. A method according to claim 1, wherein the sol is applied to the glass substrate by hand with a brush.

7. A method according to claim 1, wherein said fluoroalkylsilane compound is selected from the group consisting of $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_2SiCH_3Cl_2$ and $CF_3(CF_2)_7(CH_2)_2SiCH_3(OCH_3)_2$.

8. A method according to claim 1, wherein said alkoxysilane is selected from the group consisting of $Si(OC_2H_5)_4$, $Si(OCH_3)_4$, $CH_3Si(OCH_3)_3$ and $Si(OC_3H_7)_4$.

9. A method according to claim 1, wherein said solvent is selected from the group consisting of lower alcohols and aromatic hydrocarbons.

10. A water-repellent metal oxide film coated on a glass substrate, the film being formed in accordance with the method of claim 1.

11. A repellent to be applied to a glass substrate, the repellent being prepared in accordance with a method, the method comprising the steps of:
    mixing an alkoxysilane with a fluoroalkylsilane in the molar ratio of said alkoxysilane to said fluoroalkylsilane ranging from 1:10 to 10:1 so as to form a mixed solution;
    diluting the mixed solution with a solvent such that the total concentration of said alkoxysilane and said fluoroalkylsilane is from 1 to 10 wt % in a diluted solution; and
    adding water in the amount of 100 mol % to 1000 mol % of the total amounts of said fluoroalkylsilane and said alkoxysilane to the diluted solution so as to partially hydrolyze said fluoroalkylsilane and said alkoxysilane, thereby forming a sol.

* * * * *